United States Patent
Joseph et al.

(10) Patent No.: US 9,413,263 B2
(45) Date of Patent: Aug. 9, 2016

(54) SYSTEMS AND METHODS FOR A TRANSFORMERLESS POWER SUPPLY TO LIMIT HEAT GENERATION AT AN OUTPUT TRANSISTOR VIA TIME VARYING CURRENT DRAWS

(71) Applicant: Smart Fos, Inc., Sunnyvale, CA (US)

(72) Inventors: Neil Joseph, Sunnyvale, CA (US); Francis Joseph, Sunnyvale, CA (US)

(73) Assignee: STACK LABS INC., Sunnyvale, CA (US)

( * ) Notice: Subject to any disclaimer, the term of this patent is extended or adjusted under 35 U.S.C. 154(b) by 185 days.

(21) Appl. No.: 14/453,138

(22) Filed: Aug. 6, 2014

(65) Prior Publication Data
US 2016/0043652 A1    Feb. 11, 2016

(51) Int. Cl.
*H02M 7/217* (2006.01)
*H02M 7/06* (2006.01)
*H05B 33/08* (2006.01)

(52) U.S. Cl.
CPC ............. *H02M 7/06* (2013.01); *H05B 33/0869* (2013.01); *H05B 33/0872* (2013.01)

(58) Field of Classification Search
CPC .............................. H02M 1/32; H02M 7/1276
USPC ............ 323/237, 239, 300, 320, 324; 363/53, 363/89
See application file for complete search history.

(56) References Cited

U.S. PATENT DOCUMENTS

| | | | | |
|---|---|---|---|---|
| 5,754,419 A | * | 5/1998 | Ho ........................ | H02M 3/158 363/89 |
| RE42,161 E | * | 2/2011 | Hochstein ............... | H02J 9/065 323/282 |
| 2004/0251884 A1 | * | 12/2004 | Steffie .................... | H02M 1/32 323/282 |
| 2014/0117865 A1 | * | 5/2014 | Deng ................... | H02M 1/4225 315/200 R |
| 2014/0368741 A1 | * | 12/2014 | Joo ........................ | H02M 1/32 348/730 |
| 2015/0381068 A1 | * | 12/2015 | Newman, Jr. ......... | H02M 1/081 323/300 |
| 2016/0043652 A1 | * | 2/2016 | Joseph ............... | H05B 33/0869 363/126 |
| 2016/0043653 A1 | * | 2/2016 | Joseph ............... | H05B 33/0869 363/126 |

\* cited by examiner

*Primary Examiner* — Jeffrey Sterrett
(74) *Attorney, Agent, or Firm* — Jones Day

(57) ABSTRACT

Systems and methods are provided for a transformerless power supply configured to limit heat generation. A system includes a power supply input configured to receive power from a time-varying input voltage source. A phase control circuit is configured to generate a current control signal, where the current control signal commands power to be drawn from the power supply through an output transistor, where the current control signal commands the drawn power to have a minimum current when the time-varying input voltage is at a maximum, and where the current control signal commands the drawn power to have a maximum current when the time-varying input voltage is at a minimum. A power supply output is responsive to the output transistor, where the power supply output is configured to output power drawn from the power supply input via the output transistor, wherein the outputted power is at a consistent power level.

20 Claims, 13 Drawing Sheets

US 9,413,263 B2

SYSTEMS AND METHODS FOR A TRANSFORMERLESS POWER SUPPLY TO LIMIT HEAT GENERATION AT AN OUTPUT TRANSISTOR VIA TIME VARYING CURRENT DRAWS

CROSS-REFERENCE TO RELATED APPLICATIONS

The present application is related to U.S. patent application Ser. No. 14/288,911, filed May 28, 2014, the entirety of which is herein incorporated by reference

TECHNICAL FIELD OF THE INVENTION

This disclosure relates to power supplies and, in particular, to limiting heat generation in supplying power.

BACKGROUND

Power supplies commonly utilize transformers to step alternating current voltages from a first level to a second level. Transformers can be both monetarily expensive as well as expensive from a size and weight perspective. Elimination of transformers in a circuit can potentially reduce all of money, size, and weight expenses in a power supply.

SUMMARY

Systems and methods are provided for a transformerless power supply configured to limit heat generation at an output transistor. A power supply input is configured to receive power from a time-varying input voltage source, where the time-varying input source provides a voltage at the input that varies from a maximum level to a minimum level. An output transistor is responsive to the power supply input, where the output transistor is configured to draw power from the power supply input when the output transistor is activated. A timing circuit is configured to determine when the time-varying input voltage is between a threshold level and the minimum level, wherein the timing circuit is configured to output an activation signal to the output transistor when the timing circuit detects that the time-varying input voltage is between the threshold level and the minimum level, and a power supply output is responsive to the output transistor, where the power supply output is configured to output power drawn from the power supply input via the output transistor.

As another example, a method of providing power via a transformerless power supply configured to limit heat generation at an output transistor includes receiving power from a time-varying input voltage source, where the time-varying input voltage source provides voltage that varies from a maximum level to a minimum level. An output transistor is controlled to selectively draw power from the power supply input via an activation signal. A determination is made as to when the time-varying input voltage is between a threshold level and the minimum level, where when the time-varying input voltage is between the threshold level and the minimum level, the activation signal is provided to the output transistor. Power drawn from the power supply is outputted via the output transistor.

As an additional example, a transformerless power supply configured to limit heat generation at an output transistor includes a power supply input configured to receive power from a time-varying input voltage source. A phase control circuit is configured to generate a current control signal, where the current control signal commands power to be drawn from the power supply through an output transistor, where the current control signal commands the drawn power to have a minimum current when the time-varying input voltage is at a maximum level, and where the current control signal commands the drawn power to have a maximum current when the time-varying input voltage is at a minimum level. A power supply output is responsive to the output transistor, where the power supply output is configured to output power drawn from the power supply input via the output transistor, wherein the outputted power is at a consistent power level.

As a further example, in a method of providing power via a transformerless power supply configured to limit heat generation at an output transistor, power is received from a time-varying input voltage source, where the time-varying input voltage source provides voltage that varies from a maximum level to a minimum level. A current control signal is generated, where the current control signal commands power to be drawn from the power supply through an output transistor, where the current control signal commands the drawn power to have a minimum current when the time-varying input voltage is at a maximum level, and where the current control signal commands the drawn power to have a maximum current when the time-varying input voltage is at a minimum level. Power drawn from the power supply input is outputted via the output transistor.

DETAILED DESCRIPTION

Figure 1:
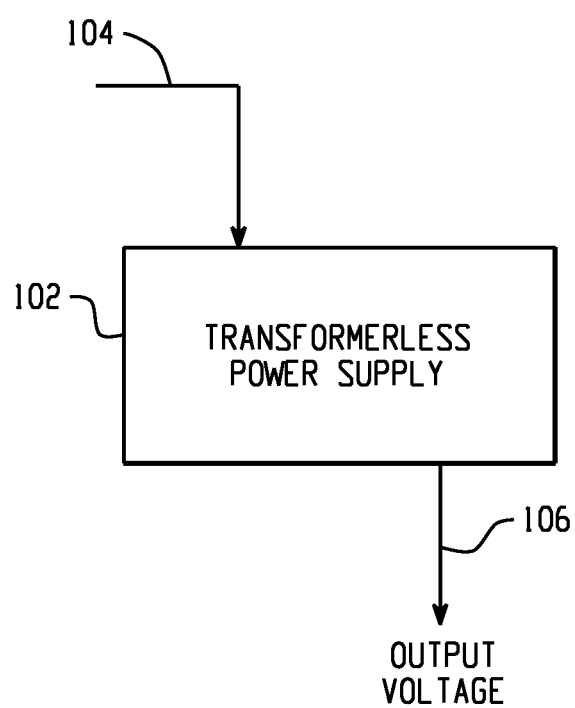
FIG. 1 is a block diagram depicting a transformerless power supply.

FIG. 1 is a block diagram depicting a transformerless power supply. A transformerless power supply 102 receives power at 104 from a power source. For example, the transformerless power supply 102 may be configured to receive alternating current (AC) power, where a voltage associated with the supplied power varies from a positive magnitude to a negative magnitude and back in a sinusoidal pattern. The transformerless power supply 102 processes the power (e.g., without or with limited use of transformers) received at 104 and outputs power (e.g., current at a voltage) at 106 that is appropriate to power a load. Loads powered by the transformerless power supply 102 may take a wide variety of forms. In one embodiment, a transformerless power supply 102 is configured to power one or more self-adjusting light sources, examples of which are described in U.S. patent application Ser. No. 14/288,911, filed on May 28, 2014, and entitled "Systems and Methods for Providing a Self-Adjusting Light Source," the entirety of which is herein incorporated by reference.

Figure 2:
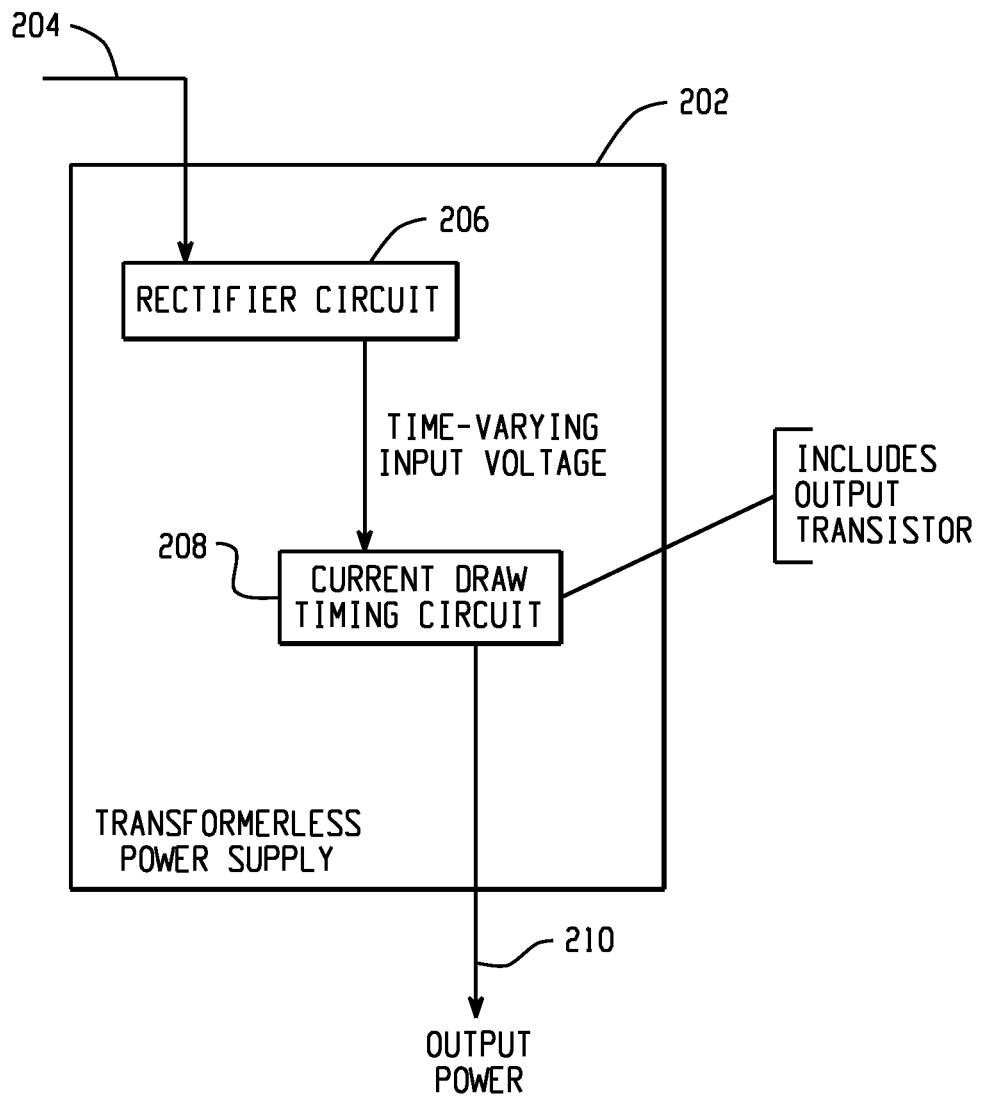
FIG. 2 is a block diagram depicting example components of a transformerless power supply.

FIG. 2 is a block diagram depicting example components of a transformerless power supply. A transformerless power supply 202 receives power at 204 from a power source. In one example, the transformerless power supply receives AC power at 204. The power received at 204 is provided to a rectifier circuit 206, which in one embodiment transforms the sinusoidal AC power to a time-varying input voltage that varies from a maximum level to a minimum level, where both the maximum and minimum levels are positive voltages. The time-varying input voltage from the rectifier circuit 206 is provided to a current draw timing circuit at 208. The current draw timing circuit 208 includes an output transistor. Heat generated at the output transistor is proportional to the current through the output transistor times the voltage at which that current traverses the output transistor. To limit an amount of heat generated at the output transistor, the current draw timing circuit limits an amount of current that is permitted to traverse the output transistor during time periods when the time-varying input voltage has a high magnitude. Power is outputted at 210 based on processing at the current draw timing circuit 208 for powering a load.

Figure 3:
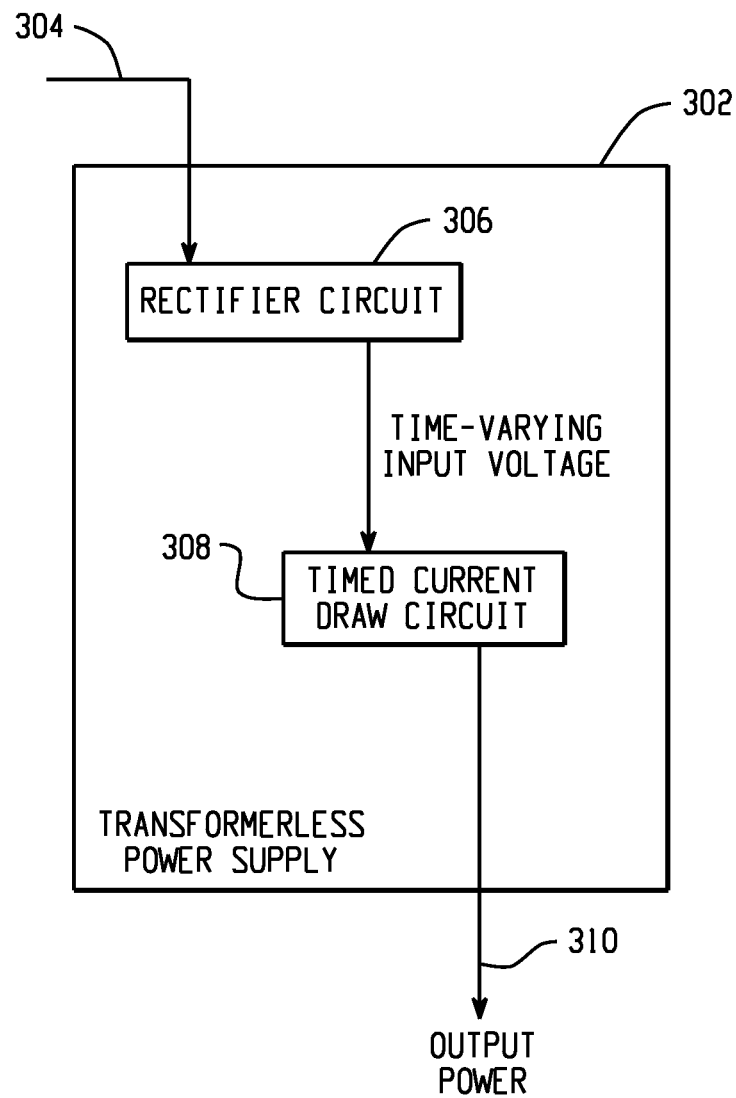
FIG. 3 is a block diagram depicting a transformerless power supply in accordance with one embodiment of the disclosure.

FIG. 3 is a block diagram depicting a transformerless power supply in accordance with one embodiment of the disclosure. A transformerless power supply 302 receives AC power at 304 from a power source. The power received at 304 is provided to a rectifier circuit 306, which transforms the sinusoidal AC power to a time-varying input voltage that varies from a maximum level to a minimum level, where both the maximum and minimum levels are positive or negative voltages.

As mentioned above, a transformerless power supply is susceptible to high levels of heat generation when large amounts of current are outputted at the same time that the time-varying input voltage is at a high magnitude level. The example of FIG. 3 addresses this via a switch that only allows current to be outputted from the transformerless power supply 302 when the time-varying input voltage is at a low level, such as below a threshold voltage level. This switch is embodied in an output transistor of a timed current draw circuit 308. The timed current draw circuit 308 is configured to determine when the time-varying input voltage is between a threshold voltage and a minimum magnitude level. The timed current draw circuit 308 is configured to output an activation signal to the output transistor when the timed current draw circuit detects that the time-varying input voltage is between the threshold level and the minimum level, where current is permitted to flow through the output transistor to an output 310 of the transformerless power supply 302 when the activation signal is received.

Figure 4:
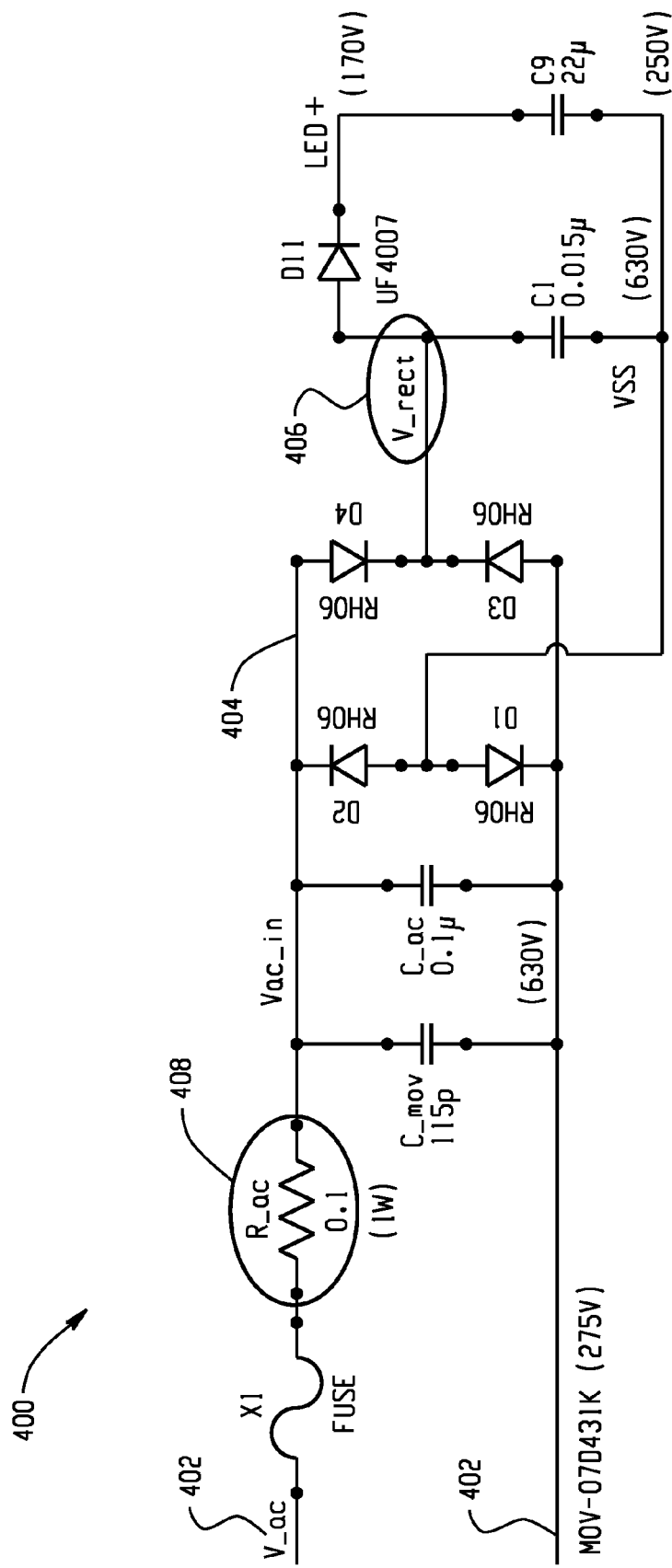
FIG. 4 is a diagram depicting an example rectifier circuit.

FIG. 4 is a diagram depicting an example rectifier circuit. A rectifier circuit 400 receives AC power at 402. The AC power, which varies sinusoidally from a negative voltage to a positive voltage is provided to a bridge rectifier circuit 404. The bridge rectifier circuit 404 includes a plurality of diodes that only permit flows of current in certain directions. The bridge rectifier circuit 404 transforms the sinusoidal input signal received at 402 into a "humped signal" that varies from a minimum magnitude level to a maximum magnitude (e.g., as shown in the top, V_rect plot 602 of FIG. 6). The output of the bridge rectifier circuit 404, V_rect 406, is tapped and provided to the downstream timed current draw circuit. In one embodiment of the disclosure, certain capacitors (e.g., C1, C9) are included in the rectifier circuit 400 to smooth waveforms and eliminate noise.

Figure 5:
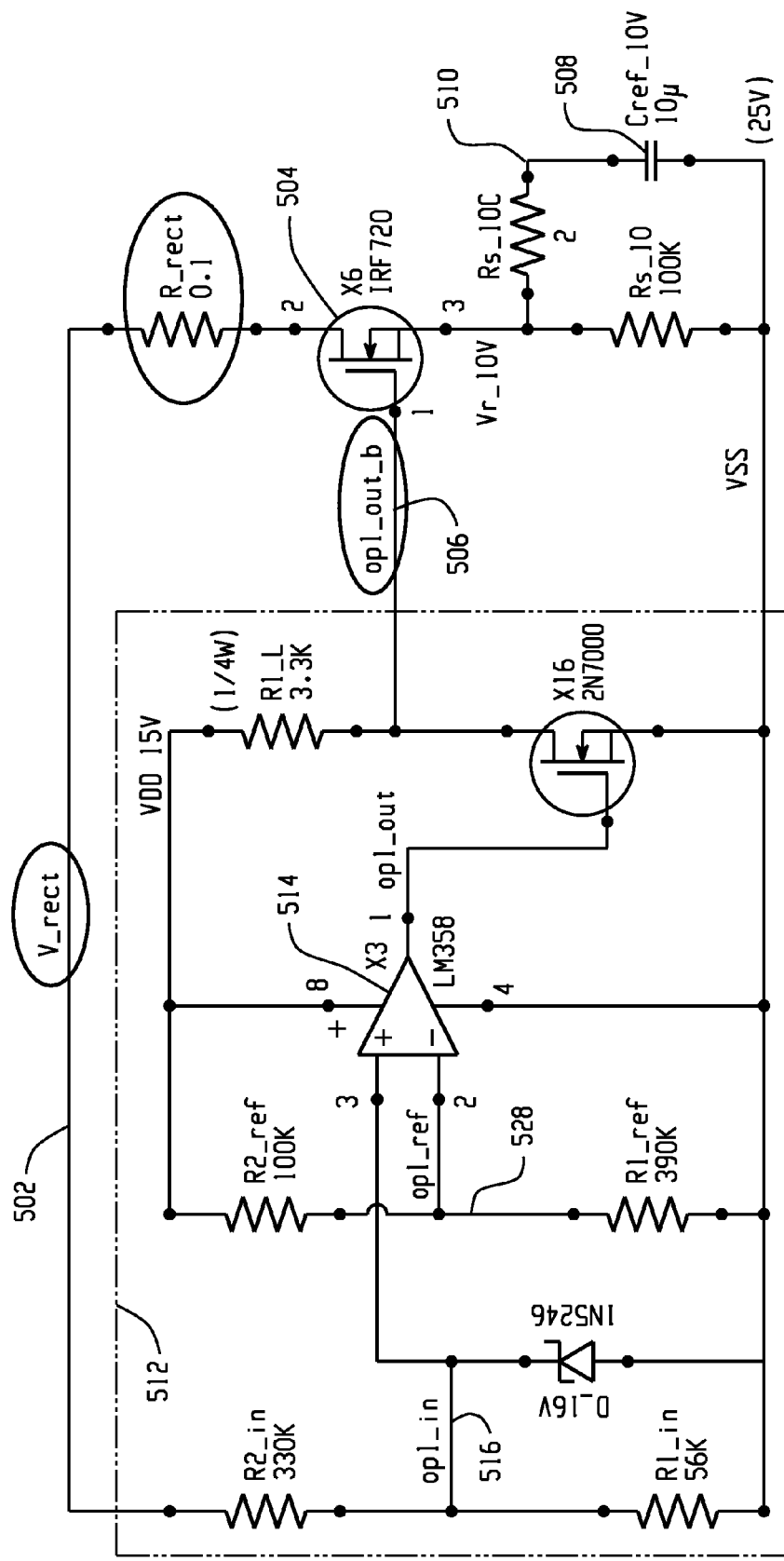
FIG. 5 is a diagram depicting an example timed current draw circuit.

FIG. 5 is a diagram depicting an example timed current draw circuit. The timed current draw circuit of FIG. 5 receives a time-varying input signal, V_rect, at 502. The time-varying input signal 502 varies from a maximum magnitude voltage level to a minimum magnitude voltage level. An output transistor 504 is responsive to the time-varying input signal 502. The output transistor 504 is configured to draw power when the output transistor is activated by an activation signal, op1_out_b 506. Power drawn via the output transistor charges an output capacitor 508, where the input node to that capacitor 508 is tapped at 510 for drawing current to power a load. The activation signal 506 is generated by a timing circuit 512. The timing circuit 512 is configured to determine when the time-varying input signal's voltage is between a threshold level and the minimum level. When the time-varying signal is in this low voltage level range, the activation signal turns the output transistor 504 on via the activation signal 506.

Heat generated at the output transistor 504 is proportional to the product of the amount of current flowing through the transistor 504 and the time-varying input signal's voltage level at that time of current flow. By limiting the flow of current through the output transistor 504 to only time periods of low magnitude time-varying input signal voltage, the power traversing the output transistor 504 and associated heat generation is minimized. Current is outputted via the output transistor 504 to the output capacitor 508 in pulses for charging the output capacitor 508 and powering external loads via node 510. During periods when the output transistor 504 is off, substantially zero power is being drawing from the power supply input. For many loads, such pulsed output power is acceptable for proper operation.

In one embodiment, the timing circuit 508 utilizes an operational amplifier 514 to generate the activation signal 506. A first voltage divider circuit 516 steps the time-varying input signal's voltage to an appropriate level for inputting to the operational amplifier 514 as a first input. The operational amplifier 514 further receives a signal representative of the threshold level, below which the activation signal 506 is to be outputted. A known voltage level (e.g., $V_{DD}$ 15V) and a second voltage divider 518 provide the signal that is representative of the threshold level to the operational amplifier 514 as a second input. As the first input from 516 varies over time, it is continually compared to the second input from 518. When the first input is at or below the second input's voltage level, the operational amplifier 514 outputs the activation signal (e.g., via transistor X16) to the output transistor 506 to enable current flow to the output capacitor 508.

Figure 6:
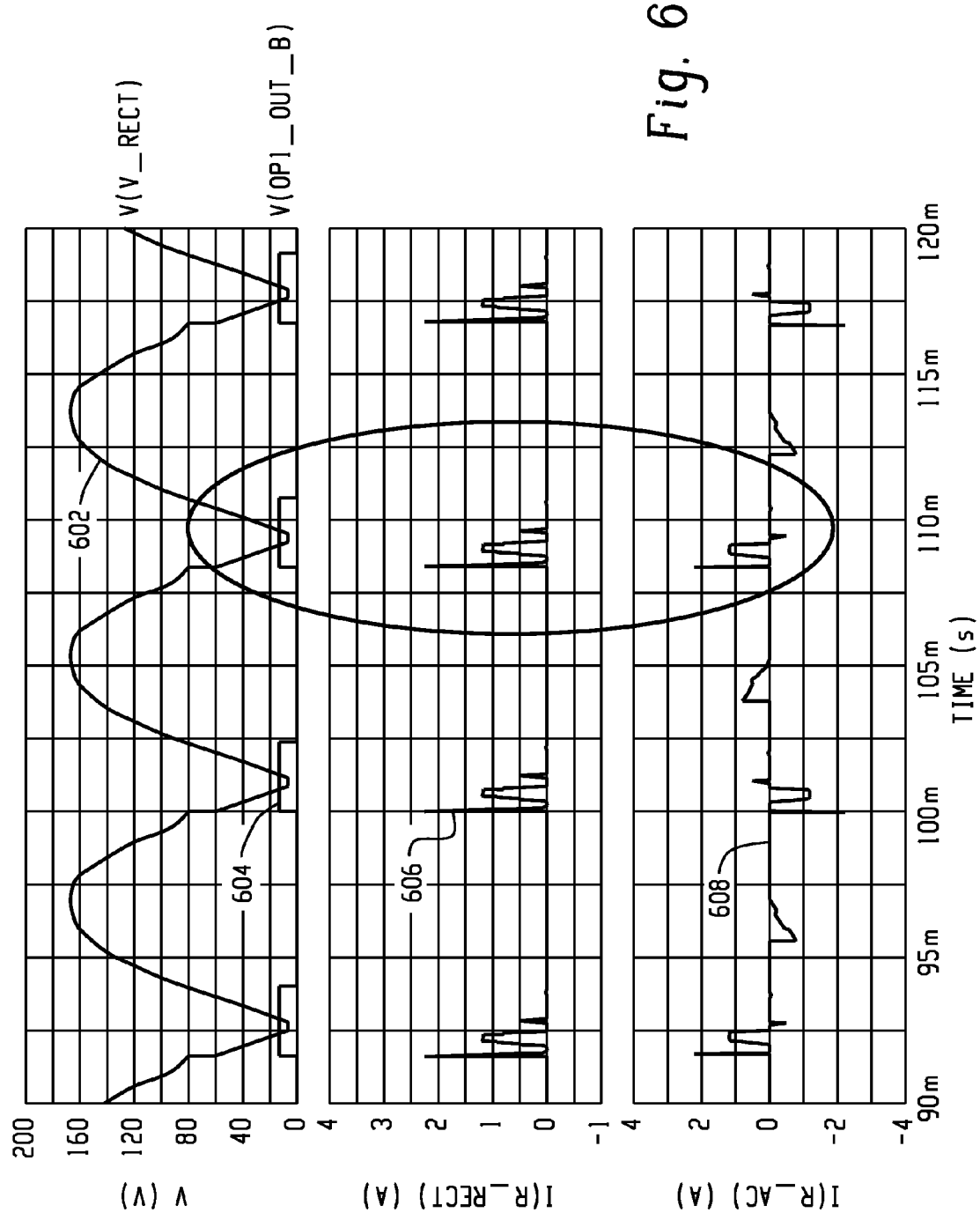
FIG. 6 is a diagram depicting example voltages and currents measured during operation of the timing circuit of FIG. 5.

FIG. 6 is a diagram depicting example voltages and currents measured during simulated operation of the timing circuit of FIG. 5. At 602, the time-varying input voltage measured at V_rect 502 of FIG. 5 is displayed, where the plot illustrates the humped signal from a rectifier circuit that varies from a maximum level near 170 volts to a minimum level near zero volts. The activation signal is depicted at 604, as measured at 506 of FIG. 5. The activation signal is outputted at a high level by the timing circuit 512 when the input voltage V_rect 502 is below the threshold of approximately 80 volts. In other embodiments, the threshold voltage can be varied as desired (e.g., to 10% of the spread between the maximum and minimum voltage levels of the input signal 502, such as to limit generated heat to a desired level). Thus, the activation signal is high when the time-varying input voltage is detected to be between the threshold level and the minimum magnitude level. The plot at 606 identifies the current flowing from the input at 502 of FIG. 5 to and through the output transistor 504. Current only flows through the output transistor 504 when the activation signal, depicted at 604, is high, which corresponds with time periods when the voltage at the input 502 is below the threshold value (e.g. ~80 volts). The plot at 608 indicates the flow of current into the rectifier circuit of FIG. 4 at 408.

Figure 7:
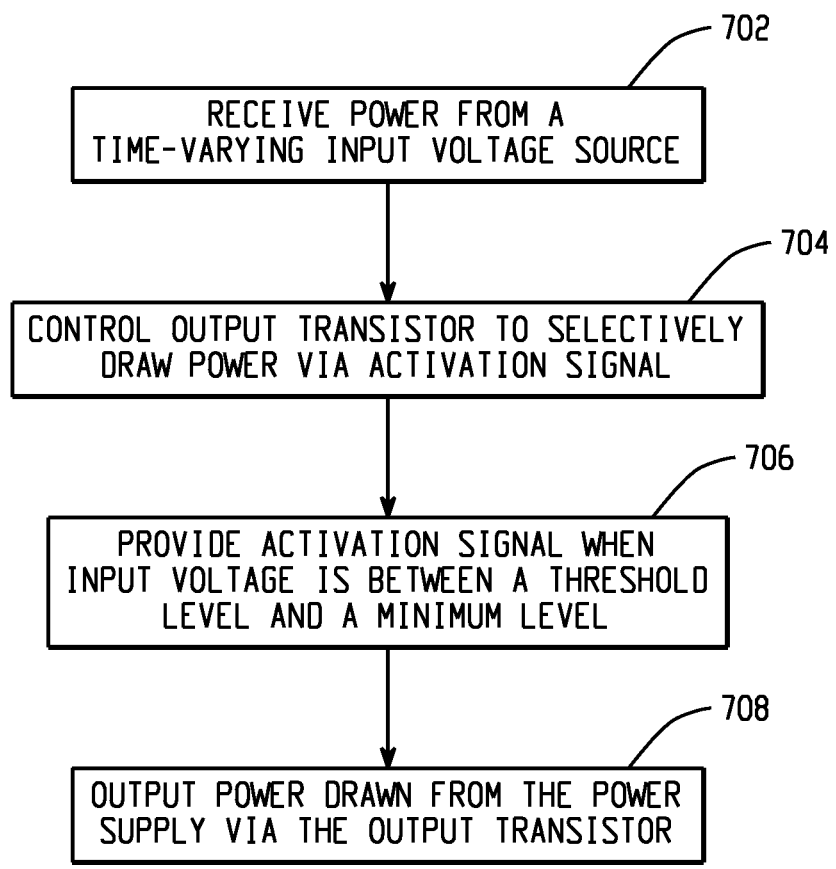
FIG. 7 is a flow diagram depicting a method of providing power via a transformerless power supply configured to limit heat generation at an output transistor.

FIG. 7 is a flow diagram depicting a method of providing power via a transformerless power supply configured to limit heat generation at an output transistor. The method includes receiving power from a time-varying input voltage source at 702, where the time-varying input voltage source provides voltage that varies from a maximum level to a minimum level. At 704, an output transistor is controlled to selectively draw power from the power supply input via an activation signal. At 706, a determination is made as to when the time-varying input voltage is between a threshold level and the minimum level, where when the time-varying input voltage is between the threshold level and the minimum level, the activation signal is provided to the output transistor. At 708, power drawn from the power supply is outputted via the output transistor.

Figure 8:
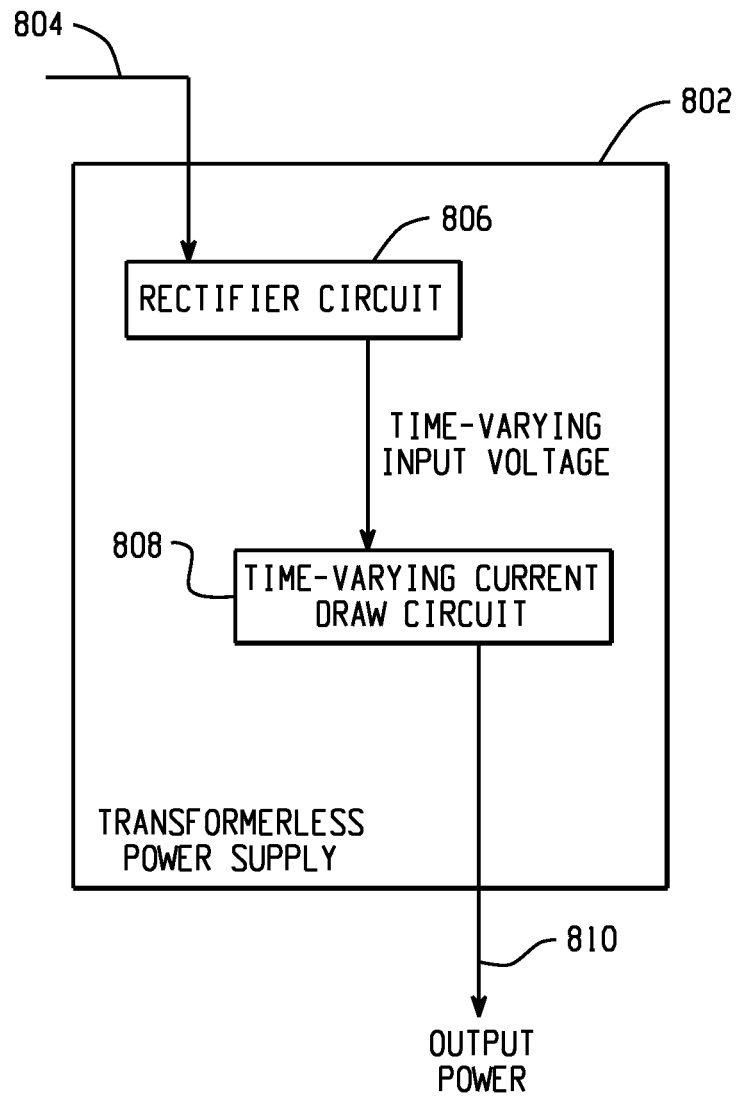
FIG. 8 is a block diagram depicting a transformerless power supply in accordance with another embodiment of the disclosure.

FIG. 8 is a block diagram depicting a transformerless power supply in accordance with another embodiment of the disclosure. A transformerless power supply 802 receives AC power at 804 from a power source. The power received at 804 is provided to a rectifier circuit 806, which transforms the sinusoidal AC power to a time-varying input voltage that varies from a maximum level to a minimum level, where both the maximum and minimum levels are positive or negative voltages.

While the example of FIGS. 3-7 limits heat generation by blocking current flow during periods of high input voltage, the time-varying current draw circuit 808 varies the flow of current based on the input voltage to limit heat generation. The time-varying current draw circuit 808 generates a current control signal that commands power to be drawn through an output transistor, where the current control signal commands the drawn power to have a minimum current when the time-varying input voltage is at a maximum level and to have a maximum current when the time-varying input voltage is at a minimum level. A power supply output at 810 is responsive to the output transistor of the time-varying current draw circuit 808 and is configured to output power drawn from the power supply input 804 at a consistent power level.

Figure 9:
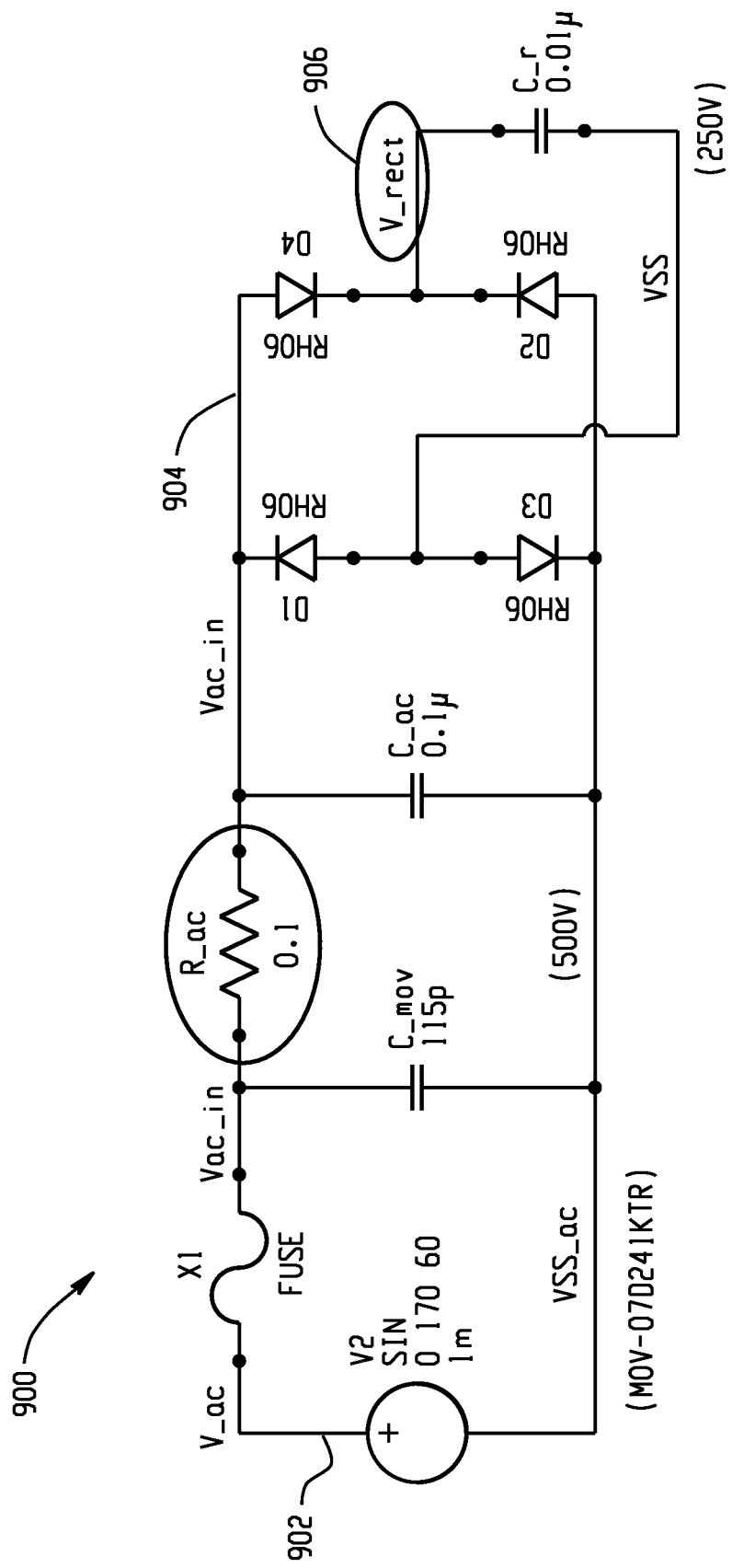
FIG. 9 is a diagram depicting a second example rectifier circuit.

FIG. 9 is a diagram depicting a second example rectifier circuit. A rectifier circuit 900 receives AC power at 902. The AC power, which varies sinusoidally from a negative voltage to a positive voltage is provided to a bridge rectifier circuit 904. The bridge rectifier circuit 904 includes a plurality of diodes that only permit flows of current in certain directions. The bridge rectifier circuit 904 transforms the sinusoidal input signal received at 902 into a humped signal that varies from a minimum magnitude level to a maximum magnitude. The output of the bridge rectifier circuit 904, V_rect 906, is tapped and provided to the downstream timed current draw circuit.

Figure 10:
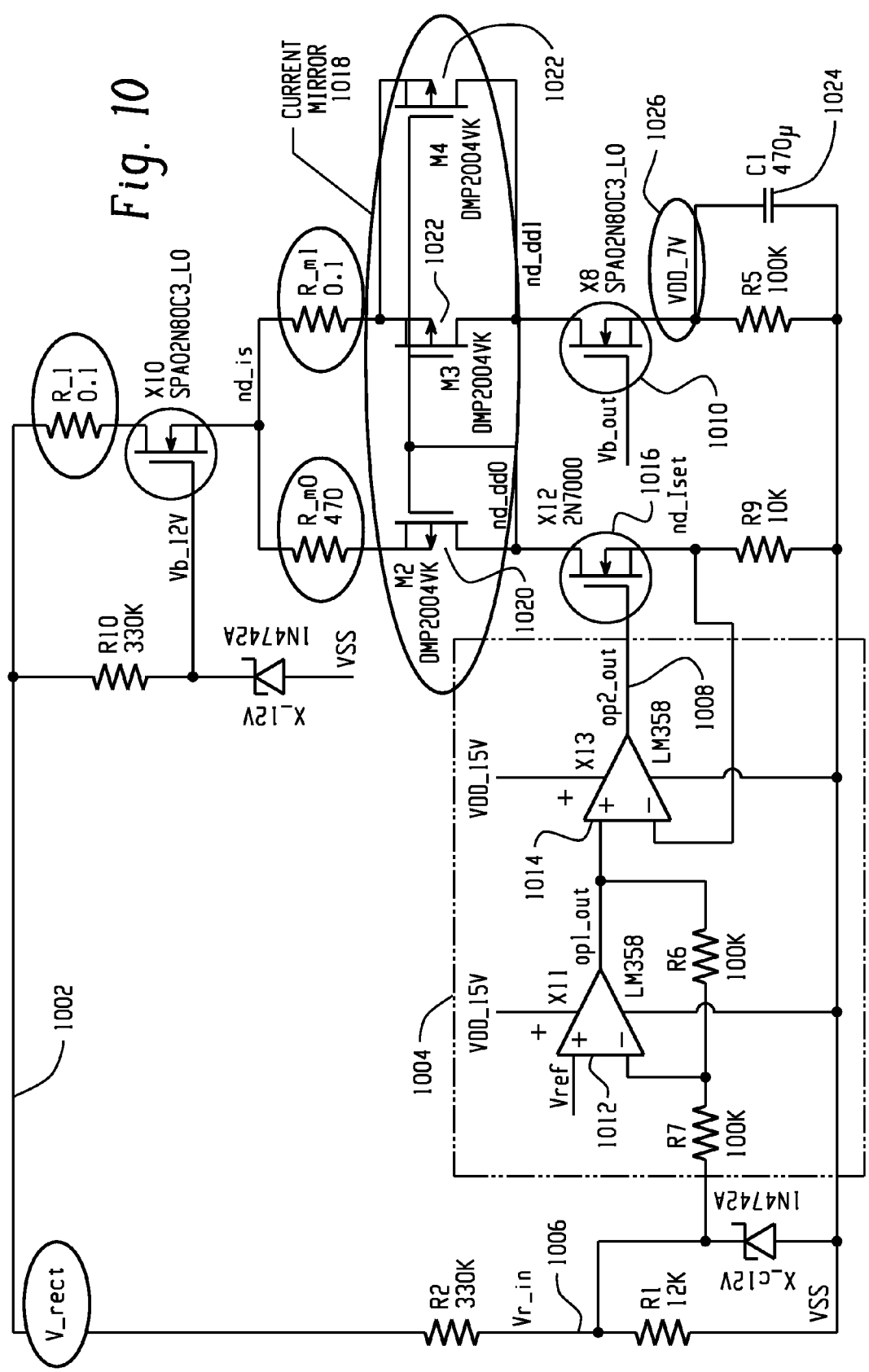
FIG. 10 is a diagram depicting an example time-varying current draw circuit.

FIG. 10 is a diagram depicting an example time-varying current draw circuit. An input signal, V_rect 1002, is received, such as from a rectifier circuit as depicted in FIG. 9. The time-varying input voltage at 1002 is provided to a phase control circuit 1004, such as via a voltage divider at 1006 that adjusts the input voltage 1002 to an appropriate level for input into operational amplifiers of the phase control circuit. The phase control circuit 1004 is configured to generate a current control signal 1008, where the current control signal commands power to be drawn from the power supply through an output transistor 1010. The current control signal 1008 commands the drawn power to have a minimum current when the time-varying input voltage at 1002 is at a maximum level and to have a maximum current when the time-varying input voltage at 1002 is at a minimum voltage.

In one example, the phase control circuit 1004 generates the current control signal 1006 using two operational amplifiers 1012, 1014. The first operational amplifier 1012 acts as a voltage inverter. Because the phase of the current desired at 1010 is opposite that of the input voltage 1002, the first operational amplifier 1012 is configured to output a signal that represents an inverse (e.g., proportional to 1/Vr_in from 1006 or −Yr_in from 1006) of the time-varying input voltage at 1002. The second operational amplifier 1014 works in concert with an intermediate transistor 1016 and a feedback loop to convert the inversed voltage from the first operational amplifier 1012 into a current. The desired current through the intermediate transistor 1016 is desired to be small in magnitude, but proportional to the inverse of the time-varying input voltage at 1002.

The time-varying current draw circuit of FIG. 10 further includes a current mirror at 1018. The current mirror 1018 includes two or more gate-tied transistors. A first current mirror transistor 1020 resides on a control branch of the time-varying current draw circuit and draws a small magnitude current based on the draw of intermediate transistor 1016, as commanded by the phase control circuit 1004. The first transistor 1020 is of small size. In the example of FIG. 10, the current mirror 1018 includes two larger transistors 1022 positioned on an operational branch of the time-varying current draw circuit. The second transistors draw current that proportional to the current of the first transistor 1020 of the current mirror, with the proportion being based on the difference in size between the first transistor 1020 and the second transistors 1022 of the current mirror 1018. Current from the operational branch of the current mirror 1018 is drawn via transistors 1022 through output transistor 1010 to charge capacitor 1024, where an output is tapped at 1026 for powering an external load.

Figure 11:
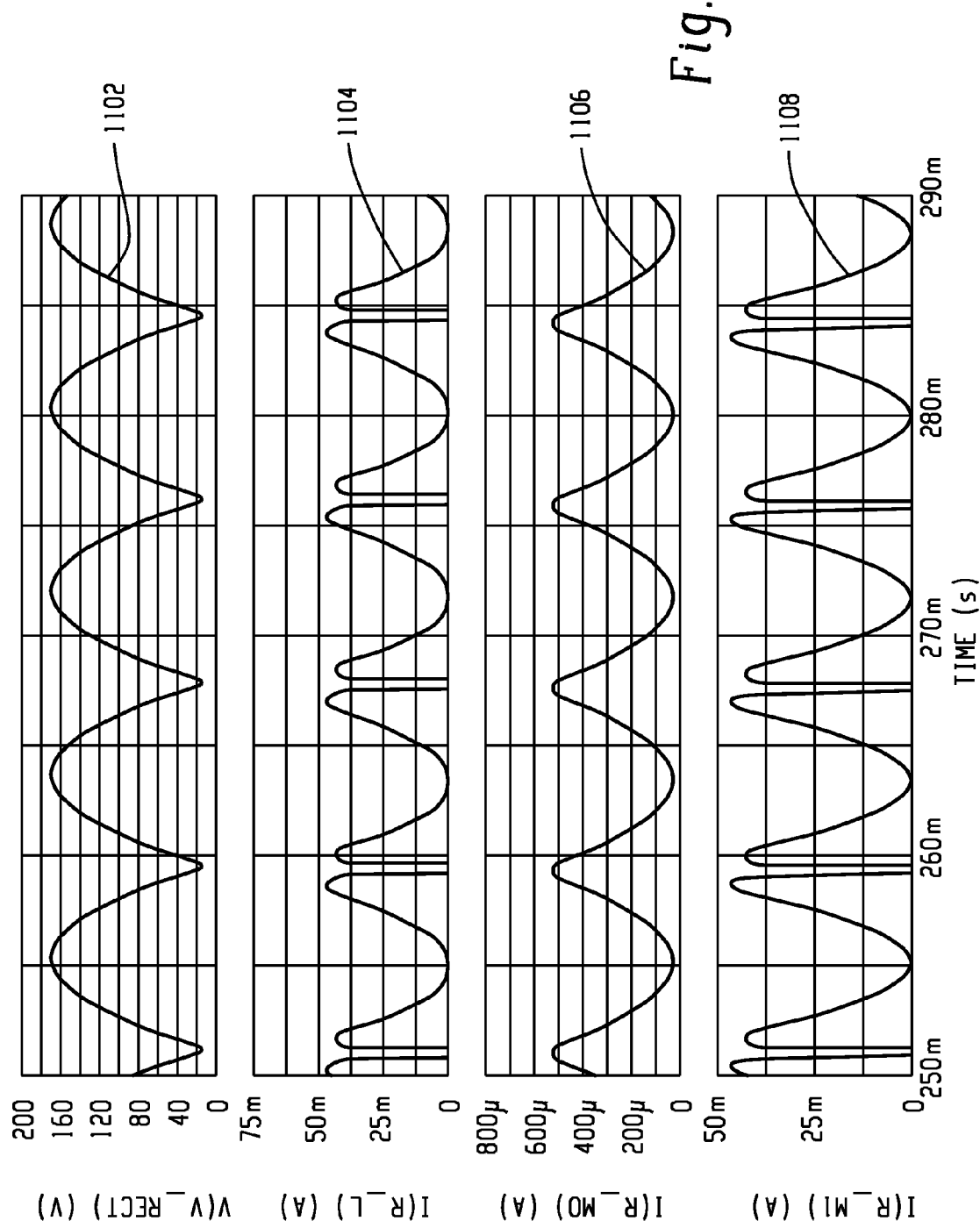
FIG. 11 is a diagram depicting example currents and voltages of the time-varying current draw circuit of FIG. 10.

FIG. 11 is a diagram depicting example currents and voltages of the time-varying current draw circuit of FIG. 10. The time-varying input voltage at 1002 of FIG. 10 is depicted at 1102. At 1104, a total current drawn from the source through both branches of the current mirror 1018 is depicted. In the plot at 1104, the current is opposite in phase to the corresponding time-varying input voltage at 1102, with low levels of current flowing when the time-varying input voltage is high, and larger currents flowing when the time-varying input voltage is low. In one example, a discontinuity in the current flow is indicated at points corresponding with minimum voltages of the time-varying input, where that time-varying input voltage is less than the turn-on voltage of certain of the larger second transistors 1022 of the current mirror 1018 or the output transistor 1010.

The current identified at 1104 is approximately equal to the sum of the currents depicted at 1106, 1108. The current at 1106 is the current through the first transistor 1020 of the current mirror and the control branch of the time-varying current draw circuit, while the current at 1108 is the current through the operational branch and second transistors 1022 of the current mirror 1018. It is noted that the currents 1106, 1108 are in common phase, with the magnitude at 1108 being substantially larger based on the use of larger second transistors at 1022 when compared to the first transistor at 1020. The opposite phase current through the operational branch and output transistor 1010 makes for a consistent power output through the output transistor 1010 throughout each cycle of the time-varying input voltage at 1002

Figure 12:
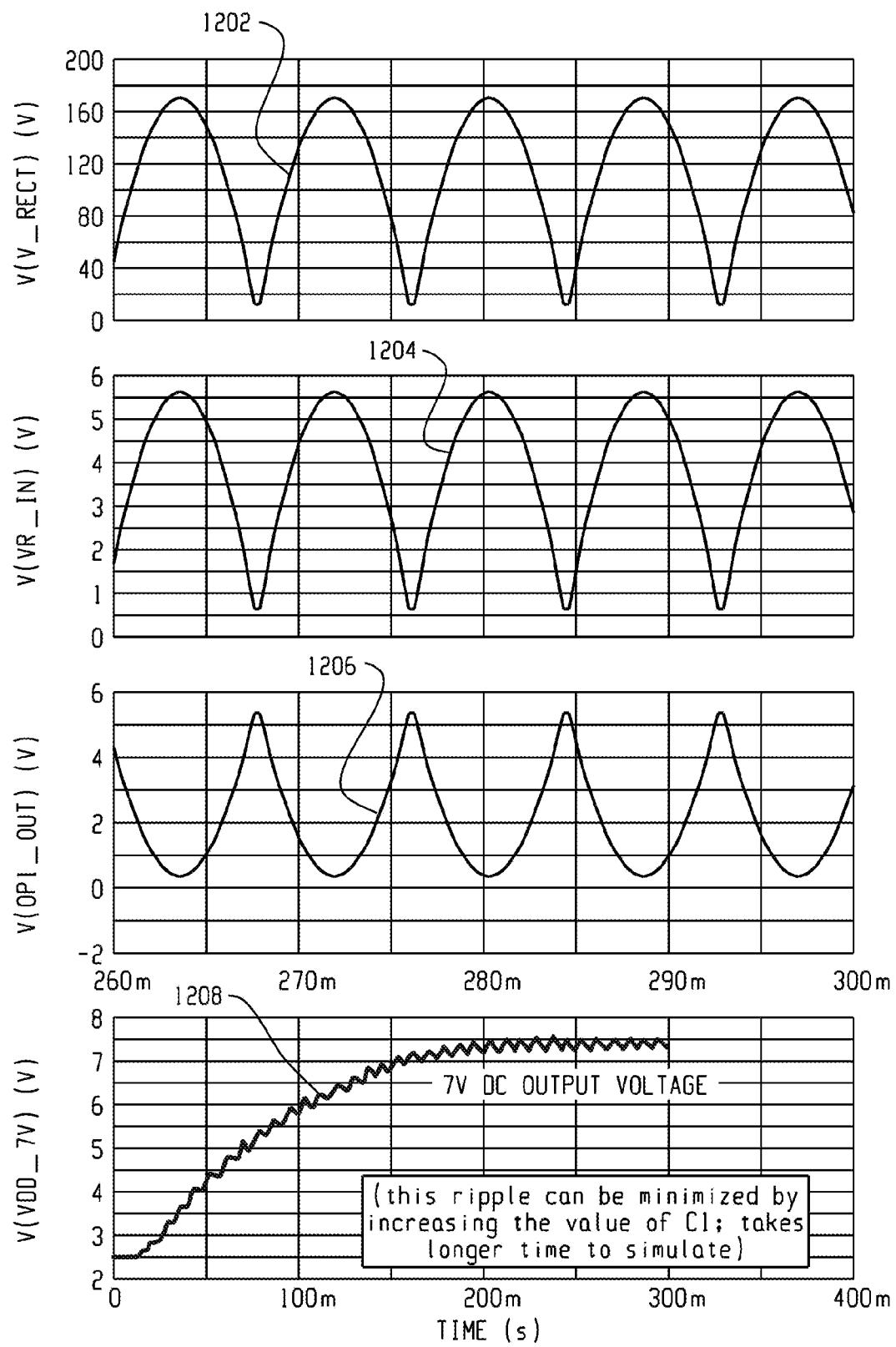
FIG. 12 is a diagram depicting input and output voltages at certain points of the phase control circuit depicted in FIG. 10.

FIG. 12 is a diagram depicting input and output voltages at certain points of the phase control circuit depicted in FIG. 10. The time-varying input voltage at 1002 of FIG. 10 is shown at 1202. A proportional voltage measured at 1006 is shown at 1204 that is based on the voltage divider and provides a stepped-down input to the first operational amplifier 1012 of the phase control circuit 1004. An output of that operational amplifier 1012 is inverted, as shown at 1206. That signal is provided to the voltage-to-current converting operational amplifier 1014 and intermediate transistor 1016 to facilitate the flow of currents through the current mirror 1018 that are opposite in phase to the time-varying voltage at the input 1002. The current through the operational branch and the output transistor 1010 charges the output capacitor 1024, as shown at 1208, where the input to that capacitor can be tapped for powering an external load.

Figure 13:
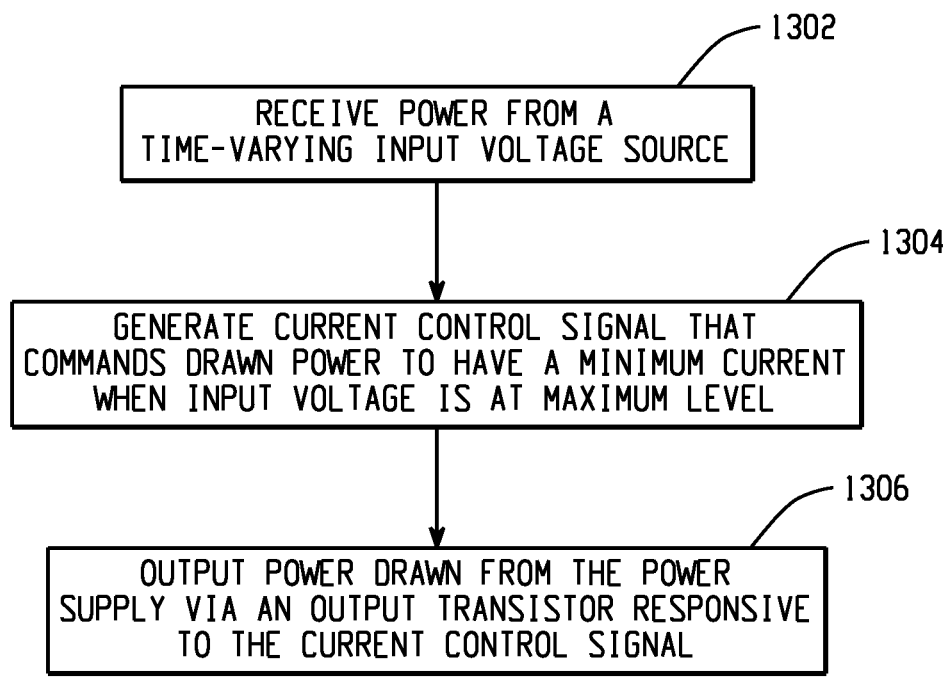
FIG. 13 is a flow diagram depicting a method of providing power via a transformerless power supply configured to limit heat generation at an output transistor.

FIG. 13 is a flow diagram depicting a method of providing power via a transformerless power supply configured to limit heat generation at an output transistor. At 1302, power is received from a time-varying input voltage source, where the time-varying input voltage source provides voltage that varies from a maximum level to a minimum level. At 1304, a current control signal is generated, where the current control signal commands power to be drawn from the power supply through an output transistor, where the current control signal commands the drawn power to have a minimum current when the time-varying input voltage is at a maximum level, and where the current control signal commands the drawn power to have a maximum current when the time-varying input voltage is at a minimum level. At 1306, power drawn from the power supply input is outputted via the output transistor.

This application uses examples to illustrate the invention. The patentable scope of the invention includes other examples.

What is claimed is:

1. A transformerless power supply configured to limit heat generation at an output transistor, comprising:
   a power supply input configured to receive power from a time-varying input voltage source;
   a phase control circuit configured to generate a current control signal, wherein the current control signal commands power to be drawn from the power supply through an output transistor, wherein the current control signal commands the drawn power to have a minimum current when the time-varying input voltage is at a maximum level, and wherein the current control signal commands the drawn power to have a maximum current when the time-varying input voltage is at a minimum level; and
   a power supply output responsive to the output transistor, wherein the power supply output is configured to output power drawn from the power supply input via the output transistor, wherein the outputted power is at a consistent power level.

2. The supply of claim 1, wherein a product of a current drawn through the output transistor and the time-varying input voltage is consistent throughout phases of the time-varying input voltage source.

3. The supply of claim 1, wherein the phase control circuit comprises an inverter, wherein the inverter receives a first signal that is proportional to the time-varying input voltage and outputs a second signal that is shifted in phase from the first signal by 180 degrees.

4. The supply of claim 3, wherein the inverter comprises an operational amplifier.

5. The supply of claim 3, wherein the phase control circuit further comprises a voltage-to-current converter, wherein the voltage-to-current converter is configured to receive the second signal and to command an intermediate transistor to draw a first current that is proportional to the second signal.

6. The supply of claim 5, wherein the phase control circuit further comprises a current amplifier, wherein the current amplifier draws a second current from the power supply that is proportional to the first current.

7. The supply of claim 6, wherein the output transistor receives the second current from the current amplifier.

8. The supply of claim 6, wherein the current amplifier is a current mirror comprised of two transistors.

9. The supply of claim 1, wherein the power supply output comprises an output capacitor that is responsive to the power drawn from the power supply input via the output transistor.

10. The supply of claim 1, wherein the time-varying input voltage source is provided to the power supply input via a bridge rectifier circuit.

11. A method of providing power via a transformerless power supply configured to limit heat generation at an output transistor, comprising:
    receiving power from a time-varying input voltage source, wherein the time-varying input voltage source provides voltage that varies from a maximum level to a minimum level;
    generating a current control signal, wherein the current control signal commands power to be drawn from the power supply through an output transistor, wherein the current control signal commands the drawn power to have a minimum current when the time-varying input voltage is at a maximum level, and wherein the current control signal commands the drawn power to have a maximum current when the time-varying input voltage is at a minimum level; and
    outputting power drawn from the power supply input via the output transistor.

12. The method of claim 11, wherein a product of a current drawn through the output transistor and the time-varying input voltage is consistent throughout phases of the time-varying input voltage source.

13. The method of claim 11, wherein the current control signal is generated using a phase control circuit that comprises an inverter, wherein the inverter receives a first signal that is proportional to the time-varying input voltage and outputs a second signal that is shifted in phase from the first signal by 180 degrees.

14. The method of claim 13, wherein the inverter comprises an operational amplifier.

15. The method of claim 13, wherein the phase control circuit further comprises a voltage-to-current converter, wherein the voltage-to-current converter is configured to receive the second signal and to command an intermediate transistor to draw a first current that is proportional to the second signal.

16. The method of claim 15, wherein the phase control circuit further comprises a current amplifier, wherein the current amplifier draws a second current from the power supply that is proportional to the first current.

17. The method of claim 16, wherein the output transistor receives the second current from the current amplifier.

18. The method of claim 16, wherein the current amplifier is a current mirror comprised of two transistors.

19. The method of claim 11, wherein the power supply output comprises an output capacitor that is responsive to the power drawn from the power supply input via the output transistor.

20. The method of claim 11, wherein the time-varying input voltage source is provided to the power supply input via a bridge rectifier circuit.

\* \* \* \* \*